(12) United States Patent
Sylvie

(10) Patent No.: US 6,744,872 B2
(45) Date of Patent: Jun. 1, 2004

(54) METHOD FOR EXECUTING SEVERAL SERVICES DURING A TELEPHONE CALL

(75) Inventor: Robin-Desnoyer Sylvie, Issy les Moulineaux Cedex (FR)

(73) Assignee: France Telecom (FR)

( * ) Notice: Subject to any disclaimer, the term of this patent is extended or adjusted under 35 U.S.C. 154(b) by 372 days.

(21) Appl. No.: 09/919,133

(22) Filed: Jul. 31, 2001

(65) Prior Publication Data

US 2002/0021795 A1 Feb. 21, 2002

(30) Foreign Application Priority Data

Aug. 9, 2000 (FR) ............................................ 00 10489

(51) Int. Cl.⁷ ............................................... H04M 3/42
(52) U.S. Cl. ............................... 379/207.02; 379/201.01
(58) Field of Search ........................ 379/207.02, 201.01, 379/221.08, 221.09, 201.12; 370/259

(56) References Cited

U.S. PATENT DOCUMENTS

| | | | | |
|---|---|---|---|---|
| 5,657,451 A | * | 8/1997 | Khello | 379/201 |
| 5,742,673 A | * | 4/1998 | Khello | 379/201 |
| 5,822,419 A | * | 10/1998 | Enstone et al. | 379/207 |
| 5,999,610 A | * | 12/1999 | Lin et al. | 379/201 |
| 6,185,519 B1 | * | 2/2001 | Lin et al. | 703/21 |
| 6,526,134 B1 | * | 2/2003 | Wallenius | 379/201.01 |
| 6,532,285 B1 | * | 3/2003 | Tucker et al. | 379/207.02 |
| 6,625,268 B1 | * | 9/2003 | Wallenius | 379/114.28 |

FOREIGN PATENT DOCUMENTS

GB  2 297 664  8/1996

* cited by examiner

Primary Examiner—William J. Deane, Jr.
(74) Attorney, Agent, or Firm—Bachman & LaPointe, P.C.

(57) ABSTRACT

This method comprises a preliminary phase for realizing services that includes breaking down, at least partially, each service to be provided in service elements that bring together processing sequences common to several services or interacting with other services, processing the call originated from a telephone network customer including transmission of a service request through the telephone network up to a service control point adapted for realizing a requested service, and execution of the requested service by the service control point, which includes setting up an initial information message and transmitting this message to other invoked services during the telephone call, the message containing a list of service element identifiers subjected to a preliminary authorization demand, a list of unauthorized service element identifiers, and a list of identifiers of information types that must be notified to the service from other services that were invoked during the telephone call.

11 Claims, 1 Drawing Sheet

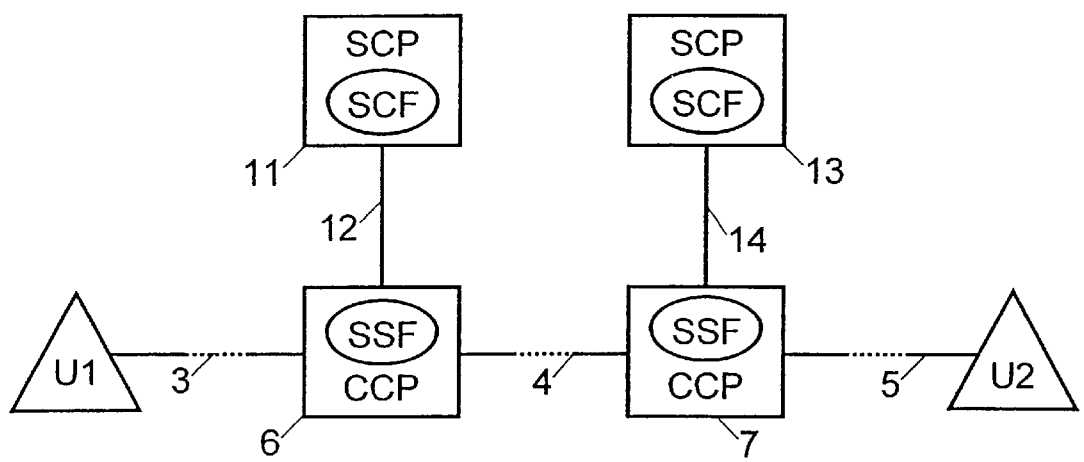
FIG. 1
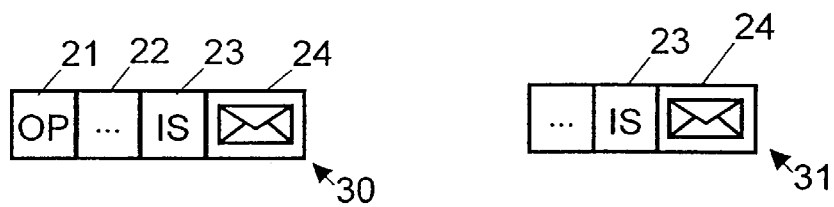
FIG. 2
FIG. 3

METHOD FOR EXECUTING SEVERAL SERVICES DURING A TELEPHONE CALL

BACKGROUND OF THE INVENTION

The present invention relates to a method for executing several services during the same telephone call, these services being selected from a large number of services that can be accessed through a telecommunication network.

It is applicable, notably but not exclusively, to so-called "intelligent" networks that were implemented to ease creation, control, and management of new services offered to users. An intelligent network is based on a physical architecture comprising call control points (CCP) that provide users with access to the network and accomplish the required selections, notably by managing calls, by detecting services requests that are offered by the intelligent network, and carrying out the call for invoked services. Some call control points include a service switching function (SSF) and are connected to one or more service control points (SCP) to provide the service control function (SCF) by means of programs which are run to provide intelligent network services. An SCP may be connected to a service data point (SDP) providing a service data function (SDF) through a database containing information related to users and services, these data being used by the associated service control point to execute customized services. A call control point connected to a service control point communicates therewith using a normalized communication protocol named INAP (Intelligent Network Application Protocol), this protocol establishing communication between SSF and SCG, SCF and SCF, SCF and SDF functions. Call control points communicate among them using ISUP (Integrated Services Digital Network-User Part) protocol, interoperability between INAP and ISUP protocols being provided by SSF function which implements at this end OCCRUI (Out Channel Call Related User Interaction) mechanisms based on the Q.860 and Q.765.4 (CS3 (capability Set) in this case) recommendations.

Presently, based on this intelligent network architecture, operators offer, for example, telephone directory services capable to call directly the corresponding party searched for, call restriction services enabling to list unauthorized numbers or prefixes, prepay services requiring consumption limit management. In other respects, recent growth in the telecommunication field makes it possible to consider many additional services, such as translation services, indication of rates while communication is occurring, voice information access, etc.

In this context, numerous problems are arising when several of services are made addressable for a customer during the same telephone call.

Thus, during a telephone call, for instance, a customer will get access to a voice directory service or through an operator, before accessing a call achievement service of the directory service so as to be in connection with the selected service, successively. Also, customers can obtain an itemized bill, gaining benefit from a communication limit which takes effect, or taking advantage from a voice mail to which their incoming calls are diverted in case of absence or if the line is busy.

These accesses for several services during one single call involve problems for authorizing access to these services, for billing their use, particularly to set up a bill with full details of the call, and for establishing a voucher. Further, these multiple accesses are likely to result in interferences among services, which occur notably when one service tries unexpectedly to make use of a resource that is used by another service, causing disturbances in service operation, especially when unauthorized numbers or numbering prefixes as well as consumption limits being allocated to the customer are to be handled, and when a payment voucher is established for a telephone call.

As an example, when a customer has subscribed to a call restriction service using a predefined list of unauthorized numbers or prefixes, thereafter if he accesses a directory service which can call on its own the party the customer is searching for, that service has to take into account the list of unauthorized numbers when making the call that is invoked, and, possibly, the communication limit the customer has paid for. Moreover, as for the itemized bill, every service that was invoked during the same call must contribute to the making up of the itemized bill relating to this call.

Nowadays, several solutions are carried out to solve these problems. One solution consists in processing interactions between services, two at a time, presumably the same call accessing only two services. It has been found that this approach was complicated even though a few number of services are presently available. Further, every time a new service is introduced the existing services have to be modified so as to be able to manage interactions with the new service.

If it is contemplated that many additional services and access to more than two services during the same call should be offered, this solution will be proved inapplicable because of the number of cases to be studied.

Another solution consists in implementing an external database through which database the different services offered can exchange information with one another. This solution requires to anticipate information the services will have to exchange with one another, knowing that adding new information in the database cannot be realized in a simple manner without service interruption and without modifying processing worked out by all services that use modified data.

There exists a normalized exchange protocol among request/response type services. This protocol is adapted to enable one service being executed during a call processing to invoke another service. However, according to this protocol, invocation of one service by another is achieved outside the context of the current call. Therefore, this protocol is not suited to handle interactions between services which are executed during the same call.

SUMMARY OF THE INVENTION

An object of the present invention is to suppress the above drawbacks by defining a general mode of cooperation among services. To this end, it provides a method for processing at least one service that is invoked during a telephone call, this method comprising a phase of processing a call, which is triggered by each call originated from a telephone network customer, and which includes transmission of a service request through the telephone network up to a service control point adapted for realizing the requested service, and execution of the requested service by the service control point.

According to the invention, this method is characterized in that it comprises a preliminary phase for realizing services that includes breaking down each service to be realized into service elements that bring together processing sequences common to several services or interacting with other services, and service execution includes setting up an initial information message and transmitting this message to other services that were invoked during said telephone call, the initial information message containing:

a list of service element identifiers subjected to a preliminary authorization demand of said service before being executed by other services that were invoked during said telephone call, a list of unauthorized service element identifiers, execution of which by other services is not authorized during said telephone call, and a list of identifiers of information types that must be notified to said service from other services that were invoked during said telephone call.

By breaking down services in service elements, the invention makes it possible to identify the parts of processing which are executed by the services, interacting with other services or being found in several different services. Hence, it enables simplification also when new services are to be provided.

Such service elements include, for example, what is named a call achievement, where a service triggers a call for a number the calling customer has not requested directly, or setting up a bill item so as to be able to collect all information that were used for determining communication rate and establishing, for instance, an itemized bill.

It has been found that the number of possible service elements is much lower than the number of services one could imagine. Consequently, having a set of predefined-service elements, the interactions of which among service elements have been studied to allow cooperation between services, enables to provide readily a large number of new services, with no requirement so as to study interactions among those new services and existing services.

Advantageously, the method further comprises handling and processing, by the service control point which executes said requested service, the authorization demands that were received from other services executed during said telephone call, and the information notifications originated from those other services, processing an authorization demand, consisting in originating through the telephone network an execution authorization demand specifying whether the service element that is mentioned in the authorization demand message may be executed or not.

According to a feature of the invention, if the service being executed is not the first service to be executed during said telephone call, the method further comprises the following steps carried out by the service being executed:

receiving the initial information message, handling the information contained in this message to demand authorizations required before executing service elements which were invoked, not executing unauthorized service elements, and notification of information the type of which appears in the list of information types to be notified by originating information notification messages that contain those information, and if necessary, updating the initial information message by inserting in this message identifiers of other service elements from the lists of unauthorized service elements and of service elements subjected to authorization, and identifiers of information types from the list of information types to be notified, and originating this message.

BRIEF DESCRIPTION OF THE DRAWINGS

One preferred embodiment of the method according to the invention will be described below, as an example not intended to be in any sense limiting, with reference to the attached drawings, in which:

FIG. 1 shows very schematically a telephone connection between two parties in an intelligent network;

FIG. 2 shows the structure of messages being exchanged between one service control point (SCP) and a call control point (CCP), which are used by the method according to the invention;

FIG. 3 shows the structure of messages being exchanged between two call control points (CCP), which are used by the method according to the invention.

DETAILED DESCRIPTION OF THE PREFERRED EMBODIMENT(S)

First of all, the method according to the invention provides for breaking down services to be realized into service elements, i.e. processing sequences that can be found in several services or interacting with other services, such as through handling of information of interest to other services.

This method applies particularly to an intelligent telephone network as shown schematically in FIG. 1. In this figure, a telephone connection 3, 4, 5 connects a calling user U1 to a called user U2. This telephone connection includes a start call control point (CCP) 6 connected directly to the user U1 through a line 3, and an end call control point (CCP) 7 connected directly to the user U2 through a line 5. The connection 4 between both call control points 6, 7 is set up by the telephone network using other call control points, if necessary.

In order to offer specific services, such as a voice mailbox service, a directory service, a voice message service, etc., the intelligent network comprises service control points (SCP) 11, 13 each connected to one respective call control point (CCP), such as 6, 7 through a semaphore network 12, 14 applying the stack of protocols INAP/TCAP/SCCP/MTP.

According to INAP protocol, call control points communicate with service control points through messages 30 containing one field dedicated to an operation number 21, followed by parameter fields 22 relating to this operation, in a number as high as necessary (FIG. 2). Messages having certain operation numbers include a specific field 23 which is intended to receive a service indicator IS.

In other respects, transmissions between call control points 6, 7 are carried out according to ISUP protocol, interoperability between INAP protocol and ISUP protocol being provided by means of mechanisms defined by OCCRUI and implemented by the SSF function for CS2 (capability Set). According to these mechanisms, the fields 23 and 24 (FIG. 2 and FIG. 3) are transmitted between connections 4, linking call control points, and connections 12, 14, linking call control points 6, 7 and service control points 11, 13.

The invention provides for using the field 23, and the subsequent fields 24 in the messages 30 intended for operations making use of the field 23, by allocating to the latter a prescribed value which is to indicate the recipients of this message that the subsequent fields of the message contain a service interaction message containing information related to the requested service, which have to be transmitted possibly to other services. If the field 23 is present and has the prescribed value, the SSF function of the call control point 6 will transfer the values of this field and the subsequent fields 24 over the connection 4.

If a user U1 dials a number corresponding to a service, such as a service implemented by a so-called voice mailbox, this number is transmitted through the network with the user number, up to a first call control point 6.

The call control point 6 will determine whether a service needs to be executed, and whether this service is managed locally, and if this is the case, it will give control to the SSF function. On the contrary, this request will be transmitted through the network 4 and will be supplied to the call control point 7 that corresponds to the requested service.

The call control point 6 having the appropriate SSF function processes the service request containing the user number and the service number as well, transmitting it to the service control point 11 for the requested service to execute the latter.

According to the invention, during this execution carried out by the SCP point 11, the service makes up a list of service element identifiers subjected to a preliminary authorization demand that must be answered by the service being executed, a list of unauthorized service element identifiers, and a list of identifiers for information types that the service being executed must be notified of.

These lists are made up of codified numbers of service elements and information types.

The user number, the called number, and an initial information message 31 (FIG. 3) containing the lists are transmitted over the telephone network through the call control point 6. In case the called number is again a service, the message is transmitted up to the call control point 7 connected to a service control point 13 realizing the requested service.

The service control point 13 is supplied with the message and executes the requested service by completing the lists of service elements subjected to authorization and unauthorized service elements, as well as the types of information the requested service must be notified of.

During the execution of the service by the service control point 13, the service control point computer checks before every execution of a service element whether the latter is in the list of unauthorized service elements or in the list of service elements subjected to a preliminary authorization.

In the former case, the requested service element cannot be executed. In the latter case, the computer transmits through the network an authorization demand message for executing the service element, this message containing the service element number, and calling and called party numbers. The service control point 11, which originated the initial information message, receives this message, checks whether the service element can be executed or not for that call, and sends back through the network a message for answering the authorization demand which contains an authorization indicator indicating whether the service element concerned can be executed or not.

The computer of the service control point 13 is supplied with this message for authorization and continues the current execution of the service according to the answer contained in this message.

It is to be noted that, when a message is transmitted through the network, it is seen successively by all the call control points 6, 7 and all the service control points 11, 13. Therefore, if one service control point 11 imposes an authorization demand on a certain service element, and if another service control point 13 doesn't authorize execution of this service element, the initial information message containing the lists of unauthorized service elements and service elements subjected to authorization as well as the list of information to be notified is updated and completed so as to transfer the identifier of the service element concerned from the list of service elements subjected to authorization into the list of unauthorized service elements.

During the execution of the service by the service control point 13, the computer of the service control point checks each time global information are handled whether its type is contained in the list of information types to be notified. If this is the case, it makes up an information notification message that contains the information to be notified.

This message is transmitted also over the network up to the service control point which requested these information to process them.

It is to be noted that all the messages being exchanged by the service control points 11, 13 are transmitted through the network which provided a connection 3, 4 between the calling user and the service control point 11 for the requested service, and through connections 12, 14. In this way, there is no requirement so as to set up direct interconnection lines between the service control points 11, 13, and to provide mechanisms establishing a connection among them that would be specific to every current call.

This method applies particularly in the case where several services are successively called for during one telephone call.

For instance, an access service through the use of an identification card enables a holder of such an identification card to access the telephone network from any terminal connected to the network. This service links with each card holder a user's profile which contains lists of unauthorized numbers (or prefixes) as well as consumption limits. Therefore, this service contains service elements such as a "payer's profile control" to check whether the requested number is authorized, a "counting information management" for managing the consumption limit, and a "call achievement" to instruct the requested number call, and also a part which is specific to the service for providing dialogue with the user.

A directory service for searching a number out of a name (possibly from an address and a first name) or a name out of a number, contains the "counting information management" and "call achievement" service elements.

A service enabling to access voice information (traffic information, for example) contains the "counting information management" service elements and possibly the "call achievement" service elements if the choice of the user results in calling another service of which the rate would not be the same, for instance.

When the access service through the use of an identification card is executed, for example, by the service control point 11, it makes the profile control unauthorized for other services that might be called during the communication (it takes responsibility for the payer of this call and no other service is authorized to control the payer's profile during that call). It imposes an authorization demand before the "call achievement" service element could be executed. Further, as it manages counting information for the entire call, it requires to be notified of all the counting information.

Therefore, the list of unauthorized service elements contains the identification of the "payer's profile control" service element, the list of service elements subjected to authorization contains the identification of the "call achievement" service element, and the list of information types to be notified contains identification of the "counting information" type. Theses lists are transmitted, for example, through the network over the lines 12, 4 in an initial information message.

Counting information contain, for instance, a service identifier and a call description, the call description bringing together a communication start date, a communication duration, and a cost which is made up of a currency unit identifier, a scale, and a value.

If, when calling the access service through the use of card, the user requests a voice directory service with call achievement, once the number of the corresponding party searched for has been found, the lists are transmitted up to the service control point which realizes the requested service, such as the SCP point 13. When the number of the corresponding party searched for by the requester has been found, the directory service originates an authorization demand to the access service through the use of card, and calls the "call achievement" service element so that the access service is able to check whether, as it appears in the requestor's profile, the latter is authorized to call the requested number, and if there exists a consumption limit, what is the maximum period of time during which he may stay in communication with the requested number. Such an authorization demand is transmitted as an authorization message which contains in particular the identification of the "call achievement" service element, and the requested number as well. Since these information have been requested, the directory service makes also notification of the counting information relating to the requested number and to the directory service itself in an information notification message. Then, the directory service waits for the answer while the access service through the use of card receives and processes this authorization demand message. After checking in the requestor's profile whether the requested number may be called, the access service through the use of card sends an authorization message which contains an authorization identifier and possibly authorization requirements. These authorization requirements may contain a consumption limit or a maximum authorized call period of time.

The directory service receives this message and, according to its contents, sets up or not the connection between the requester and the requested number.

The number which is called for in the directory service can be another voice service. In this case, this other voice service must possibly carry out the authorization demands before calling the "call achievement" service element and notifying the access service of the counting information through the use of card.

FIGS. 2 and 3 show messages being exchanged over the connections 12, 14 between the service control points 11, 13 and the respective call control points 6, 7, and over the connections 4 between the call control points, respectively.

It is to be noted that the invention is respectful of the message layout which is recommended in the corresponding protocols by specifying the fields 23, 24, the field 23 indicating that the subsequent field contains a service interaction message, i.e. an initial information message, an authorization message, or an answering message for an authorization demand, or a notification information message, in accordance with the invention.

If, in the above description, messages between services are exchanged through the telephone network, any other transmitting means can be contemplated, e.g. a direct connection between the service control points 11, 13, which supports at the same time the concept of a call context that brings together all the parameters defining a telephone call, and the notion of session that allows exchanging several messages during the same call without having to retransmit the call context.

What is claimed is:

1. Method for processing at least one service that is invoked by a customer during a telephone call, said method comprising:

providing a phase for processing a call which is triggered by each call originated from a telephone network customer and which comprises transmission of a service request through a telephone network to a service control point adapted for realizing the requested service;

executing the requested service via the service control point;

performing a preliminary phase for realizing services that includes breaking down each service to be realized into service elements that bring together processing sequences common to several services or interacting with other services; and said service executing step including setting up an initial information message containing a list of service element identifiers subjected to a preliminary authorization demand of said service before being executed by said other services that were invoked during said telephone call, a list of unauthorized service element identifiers, execution of which by said other services is not authorized during said telephone call, and a list of identifiers of information types that must be notified to said service from said other services that were invoked during said telephone call, and transmitting said initial information message to said other services that were invoked during said telephone call.

2. Method according to claim 1, further comprising handling and processing, by the service control point which executes said requested service, the authorization demands that were received from said other services executed during said telephone call, and the information notifications originated from said other services, and processing an authorization demand by originating through the telephone network an execution authorization demand specifying whether the service element that is mentioned in the authorization demand message may be executed or not.

3. Method according to claim 1, further comprising receiving an authorization message which comprises indication of authorization requirements.

4. Method according to claim 1, wherein if the service being executed is not the first service to be executed during said telephone call, the method further comprises the following steps carried out by the service being executed:

receiving the initial information message; and handling the information contained in the initial information message to demand authorizations required before executing service elements which are invoked, not execute unauthorized service elements, and notify information the type of which appears in the list of information types to be notified by originating information notification messages that contain said information.

5. Method according to claim 4, further comprising updating the initial information message by inserting in the initial information message identifiers of other service elements from the lists of unauthorized service elements and of service elements subjected to authorization, and identifiers of information types from the list of information types to be notified, and originating this message.

6. Method according to claim 5, wherein said updating of the initial information message further includes, if needed, moving one service element from the list of service elements subjected to authorization into the list of unauthorized service elements.

7. Method according to claim 4, further comprising executing one service element subjected to authorization by preliminarily originating an authorization demand message which contains at least the identifier of the service element and the requested number, waiting for an authorization message, receiving the authorization message, and in accordance with the answer contained in the authorization message, executing or not the service element.

8. Method according to claim 4, wherein if a service being executed comprises executing an unauthorized service element, said service element is not executed.

9. Method according to claim 1, further comprising communicating said call control points with service control points through messages containing one field dedicated to an operation number, followed by parameter fields relating to this operation, messages having certain operation numbers which include parameter fields of which a first field contains a service indicator, a prescribed value being allocated to the first field to indicate to the recipient of this message that the subsequent fields of the message contain service interaction information related to the service to be executed, which have to be transmitted to other services being executed possibly during the same call.

10. Method according to claim 1, wherein communicating said service control points among themselves through the telephone network.

11. Method according to claim 1, further comprising providing service elements which include a call achievement service element enabling a service to call a corresponding party number, a payer's profile control service element allowing to manage consumption limits and unauthorized numbers or numbering prefixes, and a counting information management service element to manage counting information related to communication billing.

* * * * *